Sept. 26, 1967     L. F. LUCKENBILL     3,343,566
FLOW CONTROLLER
Filed Dec. 17, 1963     2 Sheets-Sheet 1
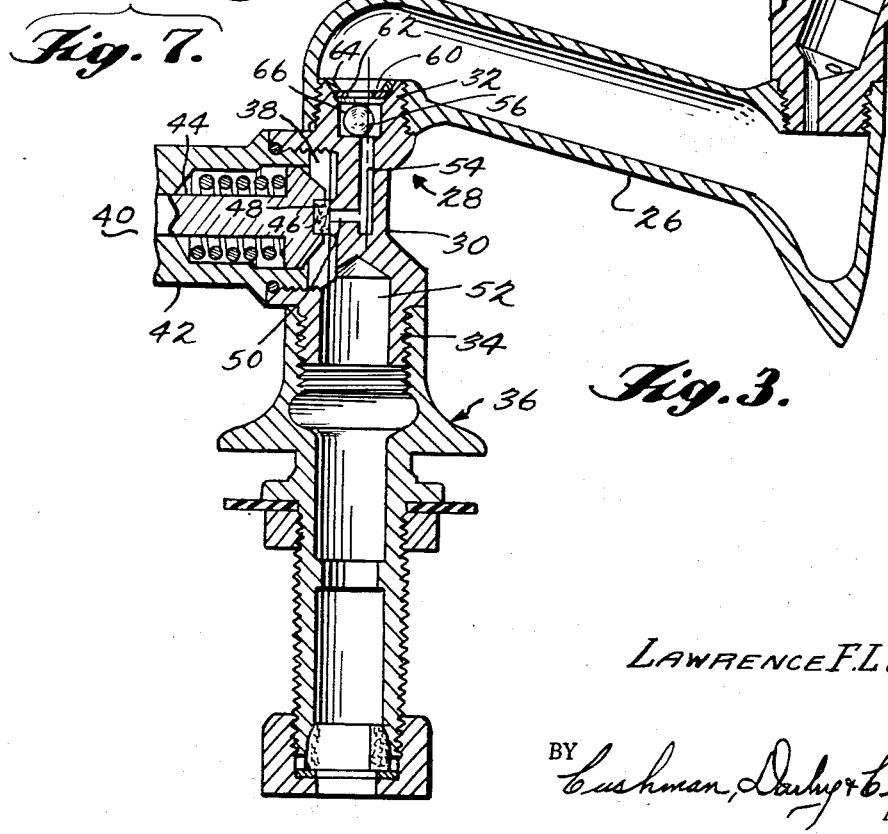
INVENTOR
LAWRENCE F. LUCKENBILL
BY Cushman, Darby & Cushman
ATTORNEYS Sept. 26, 1967 L. F. LUCKENBILL 3,343,566
FLOW CONTROLLER
Filed Dec. 17, 1963 2 Sheets-Sheet 2
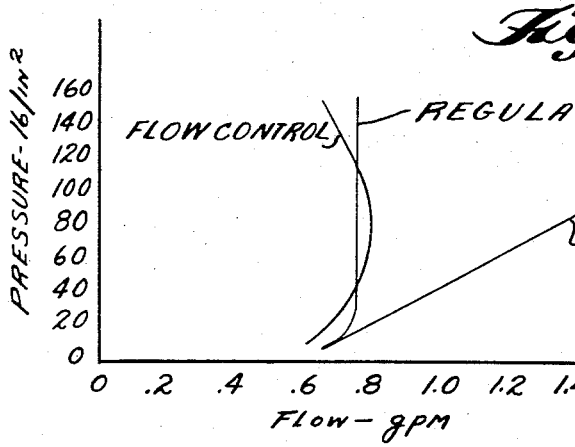
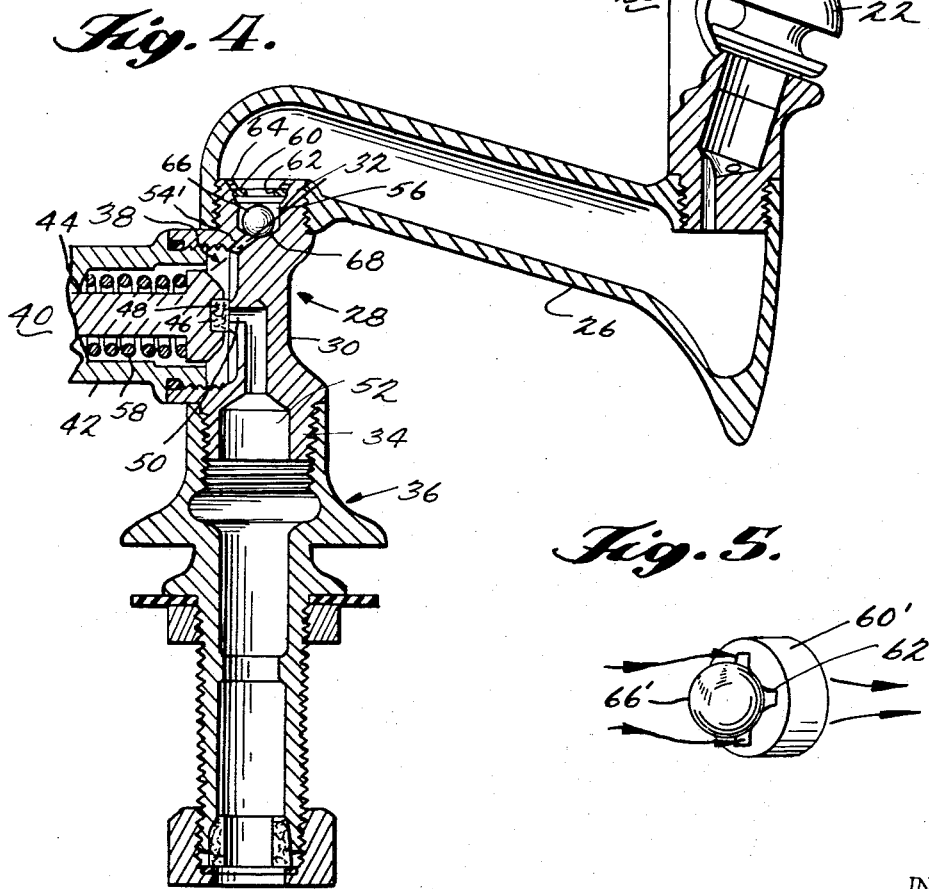
INVENTOR
LAWRENCE F. LUCKENBILL
BY Cushman, Darby & Cushman
ATTORNEYS

United States Patent Office 3,343,566
Patented Sept. 26, 1967

3,343,566
FLOW CONTROLLER
Lawrence F. Luckenbill, Decatur, Ill., assignor to Mueller Co., Decatur, Ill., a corporation of Illinois
Filed Dec. 17, 1963, Ser. No. 331,209
2 Claims. (Cl. 138—43)

This invention relates to flow control devices and, more particularly, to improvements in flow controllers of the type wherein the effective area of an orifice is adjusted automatically to maintain a substantially constant flow of fluid therethrough in spite of variations in pressure of the fluid in the supply line.

In the past, a number of arrangements have been provided to maintain fluid flow at a constant rate in spite of variations in supply line pressure. These have included pressure regulator devices responsive to variation in pressure on the downstream side of an orifice to vary the effective area thereof. Such devices suffer the disadvantage of requiring complicated and uneconomical structures. In the more simple flow controllers, the short life of the individual elements has been a constant problem and also such controllers have been subject to "squirting" on the initiation of flow.

This invention overcomes the shortcomings of prior arrangements by providing an improved economical flow control device which is simple in construction, has a long life for its operating elements, and is effective in maintaining fluid flow within a reasonable range in spite of wide pressure variation.

Another object of the invention is to provide a simple yet effective flow control device for maintaining a substantially constant flow in spite of variations in supply line pressure, and which will eliminate "squirting" at the initiation of flow.

A further object of the invention is to provide a simple, inexpensive device for controlling the flow of fluid utilizing a single element cooperating with an orifice to vary the effective area thereof in response to changes in supply line pressure of the fluid.

Ancillary to the immediately preceding object, it is a further object of the invention to provide an arrangement for operatively positioning the single element differently with respect to the orifice on each operation of the device thereby increasing the life of the element.

Further objects and the entire scope of the invention will become more fully apparent when considered in light of the following detailed description of illustrative embodiments of this invention and from the appended claims.

The illustrative embodiments may be best understood by reference to the accompanying drawings wherein:

FIGURES 1a through 1c are diagrammatic illustrations in section indicating the principle of operation of one form of the invention employing a deformable ball and a rigid orifice plate;

FIGURE 2 is an end view of the arrangement shown in FIGURE 1a;

FIGURE 3 is a side elevation view, partially in section, of a first embodiment of the invention as employed in a drinking fountain;

FIGURE 4 is a side elevation view, partially in section, of a second embodiment of the invention as employed in a drinking fountain;

FIGURE 5 is a view in perspective of an alternative form of the invention employing a rigid ball and a deformable orifice plate;

FIGURE 6 is a performance chart comparing the operating characteristics of a system without a flow control device, one with a high performance pressure regulator, and one utilizing a flow control device embodying this invention; and FIGURE 7 illustrates end views of orifice plates having exemplary orifice configurations therein adaptable to the invention.

Briefly, the invention relates to a flow control device employing an orifice plate and a movable ball on the upstream side thereof which cooperates therewith. One of these elements is deformable such that when the ball is moved under the influence of supply line pressure into cooperating relationship with the orifice plate, the effective area of the orifice is varied in response to and inversely in accordance with pressure variations of the supply line to thereby regulate the fluid flow. In one form of the invention the ball is deformable and the orifice plate is rigid whereas in another form this relationship is reversed. In its normally inoperative position, the ball rests in a position removed from but closely adjacent the orifice. The direction of flow of fluid, which moves the ball into its operative position to cooperate with the orifice, is such that a slight turning movement of the ball is generated during travel from its removed position to its operative location. This turning movement thereby permits different areas of the ball to contact the edges of the orifice during each cycle of operation. This feature is important when a deformable ball is employed since it prevents the ball from achieving a permanent imprint of the orifice edges as would be caused by positioning of the same relative area of the ball against the orifice during each cycle.

Before describing the several flow control arrangements disclosed herein, the basic operation of the devices employing a deformable ball will be described with reference to FIGURES 1a-c and FIGURE 2. Within a flow line 10 there is positioned a valve member in the form of a deformable ball 12 which is made of a resilient material, such as rubber. An orifice plate 14 having an orifice 16 therein is located within or at one end of the line 10 downstream of the ball 12. For purposes of illustration, it will be assumed that the plate 14 is one such as is shown in FIGURE 2 of the drawings having a triangular orifice 16 of dimension such that the ball 12 cannot pass therethrough but when the ball is moved thereagainst there remain flow areas not covered by the ball. In FIGURE 1a it will be assumed that the line 10 has been supplied with fluid flow upstream of the ball 12, as represented by the arrows.

The fluid initially moves the ball 12 towards the position shown in FIGURE 1b wherein the ball is in cooperative relationship with the orifice 16, partially covering the same, to thereby reduce its effective area. Under these conditions the fluid flows out of the line 10 through the several small areas of the orifice 16 not covered by the ball. Such areas constitute a restriction to flow, thus creating a pressure differential across the ball. Such pressure differential presses the ball tightly against the orifice plate 14 with resulting deformation of the ball as shown in FIGURE 1b. If the pressure in the supply line 10 increases or decreases, the pressure differential across the ball will vary accordingly with corresponding more or less deformation of the ball and a corresponding reduction or increase in the small restricted flow areas not covered by the ball. Since the effective flow area will thus vary inversely with line pressure, the flow out of the line 12 is maintained at a substantially constant rate regardless of the supply line pressure.

Referring now to FIGURE 3, an actual application utilizing one embodiment of the flow control device will be described. The construction shown in FIGURE 3 is that of a drinking fountain. The drinking fountain assembly is illustrated generally at 20 and comprises a discharge device 22 and a deflection and shielding element 24. This drinking fountain assembly is of a conventional design and need not be discussed further. The assembly 20 is joined by a connector element 26 to the flow control device designated generally as 28. The flow control device 28 comprises a main body 30 having at opposite ends thereof threaded projecting portions 32 and 34. The connector element 26 is threaded onto projection 32, as shown. The projection 34 is joined to a supply line and fixture connector assembly, illustrated generally at 36. This assembly comprises several connector elements all of which are well known in the prior art and which form no part of the present invention. Accordingly, these elements need not be described in detail. It will be understood that the assembly attaches the drinking fountain to a suitable fixture (not shown) and serves as an access to the supply line for supplying water to the drinking fountain.

On one side of the flow control device 28 an internally threaded recess 38 is provided. Projecting into this recess is a conventional shut-off valve designated generally as 40. This valve comprises a main body 42 within which a spring-pressed plunger 44 is positioned for axial movement therealong. A recess 46 is provided at the forward end of the plunger and in this recess a valve washer 48 is mounted for cooperation with a valve seat surrounding a port 50. The shut-off valve assembly is designed such that only a portion of the recess 38 is occupied by the assembly. The remaining portion serves as a communication chamber through which water from the supply line flows through the port 50 to the drinking fountain assembly 20 when the valve 40 is opened. The recess 38 thus communicates with the supply line through a bore 52 within the lower portion of the main body 30 of the flow control device. The valve port 50 communicates with a bore 54 which opens off-center or eccentrically to the bottom of a socket or recessed area 56 provided in the projecting portion 32 of the flow control device. A rigid orifice plate 60, having an orifice 62 therein, covers the recess 56 and is maintained in position by means of a suitable retaining element 64. A deformable ball 66, of rubber or other suitable resilient material, is contained within the recess 56. The proportions of the ball 66 and orifice 62 may be the same as those of the ball 12 and orifice 16 shown in FIGURES 1a, 1b, 1c, and 2.

With fluid flow shut off, the ball 66 normally rests on the bottom of the recess 56 in close adjacency to the orifice plate 60.

When the shut-off valve 40 is opened by means of conventional lever means (not shown), water flows from the supply line through channel 52, port 50, bore 54, and into the recess 56 against the ball 66. Since the flow of water from bore 54 is along a path which is directed toward but eccentric with relation to the center of the ball 66, the ball is given a slight turning movement as it is moved by the flow off the bottom of the recess 56 and into cooperating relationship with the orifice 62 of plate 60.

Under the principles described with reference to FIGURES 1a-c and by positioning the flow control device downstream of the shut-off valve, the flow of water to the discharge device is thereby regulated to a substantially constant rate and squirting during initial operation is prevented. As stated previously, as the supply line pressure increases, the ball is deformed and pressed within the orifice to decrease the effective area of the orifice thereby tending to decrease flow to compensate for the tendency of increased flow due to higher supply line pressure, an inverse result occurring on decreasing line pressure. When the shut-off valve 40 is closed, the deformable ball drops to the bottom of the recess 56 to complete the cycle.

It will be obvious that if the same area of the deformable ball 66 were presented to the orifice and subjected to high pressure during each cycle of operation, the ball would wear due to the cutting action of the edges of the orifice in the rigid orifice plate and would also become permanently deformed in this area. However, by providing a turning movement to the ball as it is elevated into cooperating relationship with the orifice plate, due to the positioning of bore 54 to supply flow eccentric to the center of the ball, it will be apparent that during each cycle a different portion of the ball engages the edges of the orifice. Accordingly, improved life of the ball is achieved.

In FIGURE 4, an arrangement very similar to that described in FIGURE 3 is set forth. In this embodiment, the bore communicating the recess 38 with the recess 56 has been modified. In addition, the recess 56 has been provided with a conical shape 68 at its bottom to provide a seat for positively positioning the ball 66 relative to the bore when the shutoff valve 40 is in the off position. Moreover, the valve port 50 communicates directly with the line 52 instead of with the bore. The bore 54′ communicating the recess 38 and the recess 56 is in this embodiment a straight path which is provided in the upper portion of main body 30. The axis of this channel is eccentric to the center of the ball 66, as shown, when the ball rests in its seat. Accordingly, just as in the embodiment of FIGURE 3, the ball is elevated due to the flow of water into the recess 56 when the shut-off valve is opened and due to the direction of fluid flow from channel 54′, the ball will once again be given a turning movement to thereby present a different surface area of the ball to the orifice plate 60 at each cycle of operation.

In the embodiments described with reference to FIGURES 3 and 4, a deformable ball 66 has been employed to cooperate with the rigid orifice plate 60 to effect the fluid control. However, the invention also contemplates the use of a deformable orifice plate and a rigid ball to be substituted for the corresponding elements of the embodiments of FIGURES 3 and 4. In FIGURE 5, there is illustrated this arrangement with a rigid ball 66′ in flow restricting cooperation with a molded, deforming orifice plate 60′. Utilizing this arrangement, flow is controlled by inversely varying the effective area of orifice 62′ in accordance with the depth to which the ball penetrates the orifice plate or extends into the orifice under the influence of line pressure.

In FIGURE 6, there is illustrated in the form of a line pressure vs. flow rate chart comparisons between an unregulated orifice, a pressure regulator, and a flow regulating device embodying this invention. Although the simple flow control device of this invention does not have the substantially perfect device of this invention does not have the substantially perfect linearity that a pressure regulator possesses, it can be seen that over a wide pressure range, flow control device of this invention does maintain a substantially constant flow regardless of the pressure of the fluid supplied thereto.

From the performance curves just described and the description of the operation of the flow control device of the invention, it can be seen that when the shut-off valve is opened, almost immediately the ball is forced against the orifice plate. This prevents squirting during initial operation of a cycle and insures that a substantially constant flow is achieved regardless of variations in supply line pressure. It will also be obvious from the foregoing that since this device operates on a variable orifice restriction principle, variations of the orifice configuration produce different flow rates for a given ball. Also a change in the size and weight of the ball will change the flow rate for a given orifice. In addition, variation in softness of the deformable material will also affect the flow rates.

The above described embodiments are illustrative of preferred embodiments of the invention but are not intended to limit the possibilities of insuring substantially constant flow and long life for the ball when this element comprises the deformable portion of the device. As examples of other modifications which may be made, orifice plates having exemplary orifice configurations shown in FIGURE 7 of the drawings may be employed in each of the described embodiments. The flow control devices disclosed herein are examples of arrangements in which the inventive features of this disclosure may be utilized, and it will become apparent to one skilled in the art that certain modifications may be made without departing from the spirit of the invention as defined by the appended claims.

What is claimed is:

1. A flow control device for maintaining a substantially constant flow of fluid therethrough despite variations in pressure of the supply of fluid thereto comprising: conduit means; a rigid orifice plate member interposed in said means and having an orifice therein; a deformable, spherical valve member disposed in said conduit means on the upstream side of said plate; said conduit means including means defining a pocket for maintaining said sphere in spaced close adjacency with the orifice when fluid is not flowing therethrough and also including means for directing a stream of fluid off-center with respect to the pocket and off-center with respect to the sphere against said sphere on the initiation of flow of fluid through said conduit means thereby to partly turn said sphere at each said initiation of flow to present a different area of said sphere for engagement with the edges of said orifice, said valve member being disposed, while fluid is flowing through said conduit means, in partial covering relation with said orifice, the relative proportions and configurations of said valve member and orifice being such that restricted flow areas are provided through said plate member when said valve member partially covers said orifice, said restricted flow areas varying in inverse proportion to the pressure of the supply of fluid to said device to thereby maintain a substantially constant rate of flow of fluid therethrough.

2. A flow control device for maintaining a substantially constant flow of fluid therethrough despite variations in pressure of the supply of fluid thereto comprising: conduit means; a rigid orifice plate member interposed in said means and having an orifice therein; a deformable, spherical valve member disposed in said conduit means on the upstream side of said plate; said conduit means including means defining a pocket for maintaining said sphere in spaced close adjacency with the orifice when fluid is not flowing therethrough, said pocket including a conical depression within which the sphere rests when fluid is not flowing through the device, said conduit means also including directing means including a passageway extending through a side wall of said depression for directing a stream of fluid off-center against said sphere on the initiation of flow of fluid through said conduit means thereby to partly turn said sphere at each said initiation of flow to present a different area of said sphere for engagement with the edges of said orifice, said valve member being disposed, while fluid is flowing through said conduit means, in partial covering relation with said orifice, the relative proportions and configurations of said valve member and orifice being such that restricted flow areas are provided through said plate member when said valve member partially covers said orifice, said restricted flow areas varying in inverse proportion to the pressure of the supply of fluid to said device to thereby maintain a substantially constant rate of flow of fluid therethrough.

References Cited

UNITED STATES PATENTS

| | | | |
|---|---|---|---|
| 975,243 | 11/1910 | Hitchcock | 137—533.11 |
| 2,861,590 | 11/1958 | Loehle | 137—517 X |
| 2,962,046 | 11/1960 | Bochan | 137—517 X |
| 3,087,761 | 4/1963 | Stelzer | 137—517 X |

WILLIAM F. O'DEA, *Primary Examiner.*

HAROLD WEAKLEY, *Examiner.*